(12) United States Patent
Van Liempd

(10) Patent No.: US 8,505,716 B2
(45) Date of Patent: Aug. 13, 2013

(54) PACKAGED PRODUCTS AND ARRAY OF BANDOLEER OF PACKAGED PRODUCTS

(75) Inventor: Albertus Cornelis Van Liempd, Veghel (NL)

(73) Assignee: Mars, Incorporated, McLean, VA (US)

( * ) Notice: Subject to any disclaimer, the term of this patent is extended or adjusted under 35 U.S.C. 154(b) by 595 days.

(21) Appl. No.: 12/529,132

(22) PCT Filed: Feb. 26, 2008

(86) PCT No.: PCT/EP2008/052303
§ 371 (c)(1),
(2), (4) Date: Apr. 30, 2010

(87) PCT Pub. No.: WO2008/107341
PCT Pub. Date: Sep. 12, 2008

(65) Prior Publication Data
US 2010/0236964 A1    Sep. 23, 2010

(30) Foreign Application Priority Data
Mar. 5, 2007 (EP) .................................. 07103511

(51) Int. Cl.
*B65D 65/28* (2006.01)
(52) U.S. Cl.
USPC ........................................ 206/216; 229/87.05
(58) Field of Classification Search
USPC . 206/484, 484.1, 484.2, 216, 223; 229/87.05, 229; 229/87.08, 87.07
See application file for complete search history.

(56) References Cited

U.S. PATENT DOCUMENTS

| 2,213,758 | A |   | 9/1940  | Eichberg et al. ................ 229/51 |
| 2,408,616 | A | * | 10/1946 | Eldredge ....................... 206/526 |
| 2,596,620 | A |   | 5/1952  | Townsend ....................... 229/87 |
| 2,736,656 | A | * | 2/1956  | Marshall ....................... 426/396 |
| 3,278,019 | A | * | 10/1966 | Martin et al. ................. 206/555 |
| 3,924,803 | A | * | 12/1975 | de Habsburg ............. 229/87.05 |

(Continued)

FOREIGN PATENT DOCUMENTS

| BE | 386360    |    | 3/1932  |
| EP | 1367005 A1 |   | 12/2003 |

(Continued)

OTHER PUBLICATIONS

Jun. 22, 2011 Opposition Response in connection with corresponding European Patent No. EP 2134624.

(Continued)

*Primary Examiner* — Jacob K Ackun
(74) *Attorney, Agent, or Firm* — Fitzpatrick, Cella, Harper & Scinto

(57) ABSTRACT

The invention relates to a packaged product (3) or group (19) of products, such as a candy, wherein said product or group of products (3) has an elongated form, wherein the package comprises at least one film (1, 2) which encloses said product or group of products, and wherein part of said film extends from at least one outer end of the product or group of products, and wherein said part of the film is bent away from the direction of the axis of the elongated product or group of products back towards a part of the film that surrounds the product and is bonded therewith. The invention also relates to an easy opening arrangement for packaged products, and to an array or bandoleer (19) of products with reduced packaging material.

15 Claims, 7 Drawing Sheets

(56) References Cited

U.S. PATENT DOCUMENTS

| | | | | |
|---|---|---|---|---|
| 4,053,046 A | * | 10/1977 | Roark | 206/274 |
| 4,290,526 A | | 9/1981 | Haiss | 206/624 |
| 4,666,079 A | * | 5/1987 | Bolli et al. | 229/87.05 |
| 4,723,701 A | * | 2/1988 | Deutschlander | 229/87.08 |
| 4,724,997 A | * | 2/1988 | Hogenkamp et al. | 229/87.08 |
| 4,785,609 A | * | 11/1988 | Widmann | 53/461 |
| 4,850,526 A | * | 7/1989 | Naef et al. | 229/87.08 |
| 4,897,983 A | * | 2/1990 | Hogenkamp et al. | 53/461 |
| 5,029,712 A | * | 7/1991 | O'Brien et al. | 229/87.05 |
| 5,100,003 A | * | 3/1992 | Jud | 229/87.05 |
| 5,316,209 A | | 5/1994 | Tomisawa et al. | 229/87.05 |
| 5,518,119 A | | 5/1996 | Takahashi | 206/497 |
| 5,875,894 A | * | 3/1999 | Stromme | 206/541 |
| 6,335,042 B1 | * | 1/2002 | Money | 426/106 |

FOREIGN PATENT DOCUMENTS

| | | |
|---|---|---|
| EP | 1547936 A1 | 6/2005 |
| EP | 1967465 | 9/2008 |
| GB | 124197 A1 | 10/1919 |
| GB | 259165 | 10/1926 |
| GB | 850457 A | 10/1960 |
| GB | 2 336 825 | 11/1999 |
| JP | 10147635 A1 | 6/1998 |
| JP | 10152179 A | 6/1998 |
| JP | 11-301744 | 11/1999 |
| WO | 2005/019036 | 3/2005 |
| WO | 2005/019036 A1 | 3/2005 |

OTHER PUBLICATIONS

Decision on Opposition issued in European Application No. 08717134.4, dated Feb. 18, 2013.

* cited by examiner

PACKAGED PRODUCTS AND ARRAY OF BANDOLEER OF PACKAGED PRODUCTS

The invention relates to a packaged product or group of products, such as a candy, wherein the package comprises at least one film which encloses said product or group of products.

Such a product is described in WO 2005/019036, wherein an array of packaged candy bars is disclosed. The current invention aims at improving packaged products such that they are cheap in production, easy and efficient to handle and store, have improved display opportunities, are easy to open, and/or require little packaging material.

It is an aim of some aspects of the invention to provide a packaged candy bar that is easy to open, compared to the manner in which currently candy bars have to be opened. In order to arrive at the invention, the inventor has studied how people "open" their fruit, and discovered that there was one favorite fruit in terms of easy opening, namely the banana. Thus a package was designed that mimics much of the features of a banana peel and that is at the same time easy and fast to produce.

Also it is an aim of some aspects of the invention to provide a package that has excellent display opportunities, and at the same time minimizes the need for packaging material. It was recognized that a large flat printing area without folds or other obstacles on the outside of the package is desirable. In traditional packages of a multitude of candy bars this is achieved by arranging the candy bars (which may or may not be individually packaged) side by side in an array, and wrapping said array in an enclosure, such that the flat side of the enclosure covering the upper side of the candy bars forms one large flat printing area. The invention also aims at improving the printing area of one single packaged candy bar, while minimizing the packaging material. Traditionally packaged candy bars often have a fin at the bottom, formed by the sealed longitudinal sides of the packaging film.

It is a further aim of some aspects of the invention to provide a simple and easy to produce package wherein a multitude of block shaped candy bars can be packed in a dense manner while minimizing the use of packaging material, and yet having a large printing area on the outside surface. Traditional bandoleer packaging methods provide a relatively large printing area, but they are not suitable for packaging block shaped products such as candy bars in a dense manner.

Even further aims and advantages of the invention will be apparent from the current specification.

According to one aspect of the invention part of said film extends from at least one outer end of the product or group of products, and said part of the film is bent backwards towards a part of the film that surrounds the product and is bonded therewith. By pulling said bent extending part of the film, the part of the film that surrounds the product and that is bonded to the bent part is torn apart, and thereby the package is opened in a very easy, efficient and hygienic manner.

In the preferred embodiment said product or group of products has an elongated form and said part of the film is bent away from the direction of the axis of the elongated product or group of products, back towards said part of the film that surrounds the product and is bonded therewith. Preferably the area adjacent the outer end of said bent part of the film is not bonded to the other part of the film, such that a person can grab and pull said unbonded part. In the preferred embodiment said bond is provided by a cold seal. However, other types of bonds may be chosen.

Preferably the film is provided with a cut and/or a weakened line in the area of the bond with the part of the film that is bent, such that said cut and/or weakened line in said film is covered and sealed in an airtight manner by said bent part of the film. Preferably said cut is substantially U-shaped or V-shaped, wherein the curve of said U-shape or the point of said V-shape extends away from the outer end of the product or group of products. Adjacent said cut and/or weakened line preferably a further weakened line is provided in the film extending at both sides from said cut and/or weakened line, and extending around the axis of the product along at least half the circumference of the product. Said further weakened line is preferably provided in one of two films between two opposite sealed sides of the film. Hereby the packaging can be peeled open easily like a banana.

Also in the preferred embodiment the package comprises two substantially rectangular films which are sealed together and enclose said product or group of products. One of said films is in the preferred embodiment substantially flat and the other film is shaped to fit at least partially around the product or group of products. The shaped film has in the preferred embodiment a substantially U-shaped cross section in the direction transverse to the product or group of products, wherein the flat film is sealed to the edges of the U-shaped film, such that the sealed parts of the films both extend outwardly, away from the product. The package that is formed this way has a flat side without a fin, having an increased printing area.

The bent part or parts of the sealed films are preferably bonded to the ridge of the U-shaped film that extends away from the flat film. The bent part or parts of the sealed films are preferably bonded to said ridge near the outer ends of the product or group of products. The bent part or parts of the sealed films are in a first embodiment folded twice to form sharp perpendicular angles, once near the plane of the flat film, and once near the plane through the ridge of the U-shaped film to which the sealed films are bonded. Preferably the bent part or parts of the sealed films are folded close to the outer ends of the product or group of products.

In another embodiment the bent part or parts of the sealed films are folded back once to form a sharp small angle at a distance from the outer ends of the product or group of products. Thereby a still larger printing area is provided on the package.

The invention also relates to a bandoleer or an array of packaged products or groups of products as described above, wherein the products are connected to each other at opposite longitudinal sides of said products, in particular through parts of said rectangular two films that are sealed together.

The invention furthermore relates to an array of packaged products, such as candies, wherein said products or groups of said products have an elongated form and extend parallel to each other, wherein the package comprises two substantially rectangular films which are sealed together and enclose said products or groups of products, wherein one of said films is substantially flat and the other film is shaped to fit at least partially around the products.

In accordance with another aspect of the invention the parts of the sealed films extending from the outer ends of the products or groups of products are bent out of the plane of the flat film and bonded to the other, shaped, film in order to give the array rigidity in the direction transverse to the products or groups of products.

In the preferred embodiment the shaped film has a substantially corrugated form in the direction transverse to the products, wherein the flat film is sealed to the ridges of the corrugated film that extend on one side of the products. Preferably the bent parts of the sealed films are bonded to the ridges of the corrugated film that extend away from the flat film.

Preferably the sealed areas between the products are weakened, such that the packaged products can be easily separated. Preferably the products are positioned transversely with respect to the elongated films. In the preferred embodiment the portions of the films that are sealed together between the products are provided with a score extending between both side edges of the films, and an elongated cut is provided on the centre part of said score, which cut has a length of approximately 10%-30% of the length of the products. Hereby the products can be easily separated while still a rigid array is obtained through relatively firmly connected bent sides.

The invention also relates to a bandoleer or an array, wherein the thickness of the products in the direction perpendicular to the plane of the bandoleer or array is larger than, preferably at least two times, more preferably at least three times the distance between the products in the longitudinal direction of the bandoleer or array.

Preferably the products are packaged in a removable enclosure, wherein the products are positioned on a first sheet which is continuously moved in a transport direction, wherein the products are covered by a second sheet which is continuously moved in the same transport direction and which is aligned substantially plane-parallel to the first sheet, and wherein the first and second sheets are sealed together near the outer edges of the individual products or grouped products by a sealing device.

The sealing device preferably comprises sealing ribs extending substantially transversely to the transport direction on one side of the moving sheets, wherein said sealing ribs are being moved at the same speed as the sheets and the sealing ribs seal the first and second sheets together in between the moving products. Thereby the sheets can move continuously, without the need to interrupt the movement for sealing the sheets together. Preferably the sealing device comprises a rotating frame, the rotation axis of said frame extending transversely to the transport direction, wherein said sealing ribs extend from a coaxial cylindrical surface of said frame.

In order to prevent damage to the products, in particular if the products have a substantial height, at least one of said sheets is preferably pre-shaped to fit at least partially around the products before the film comes into contact with the products. Said pre-shaping action is preferably performed by a pre-shaping device comprising a first rotating shaping frame on one side of the moving sheet and a second rotating shaping shape on the opposite side of the moving sheet, the rotation axes of both frames extending transversely to the transport direction of the sheet, wherein said frames comprise co-operating protruding shaping ribs extending substantially transversely to the transport direction, wherein the shaping ribs of both frames move between each other, and wherein said shaping ribs are being moved at the same speed as the pre-shaped sheet. Preferably the first pre-shaping frame is positioned such that it guides the pre-shaped film towards the other moving sheet while including the products. Preferably the first pre-shaping frame is the same frame as the rotating frame of the sealing device, and the shaping ribs on said frame are said sealing ribs.

The described method is particularly advantageous when the products have an elongated form and are positioned transversely on the first moving sheet. The sealing ribs may for instance comprise hot seal means. Preferably however the sealing ribs comprise ultrasonic welding means, in particular when the products have ingredients that melt easily. Preferably the sealed areas between the products are perforated or scored, such that the packaged products stay attached to each other, but can be easily separated.

At least one of said sheets is preferably pre-shaped by a pre-shaping device to fit at least partially around the products before the sheet comes into contact with the products, wherein said pre-shaping device comprises a first rotating shaping frame on one side of the moving sheet and a second rotating shaping frame on the opposite side of the moving sheet, the rotation axes of both drums extending transversely to the transport direction of the sheet, wherein said frames comprise co-operating protruding shaping ribs extending substantially transversely to the transport direction, wherein the shaping ribs of both frames move between each other, and wherein said shaping ribs are being moved at the same speed as the pre-shaped sheet.

The invention will be illustrated by way of exemplary embodiments with reference to the drawings, wherein.

Figure 1:
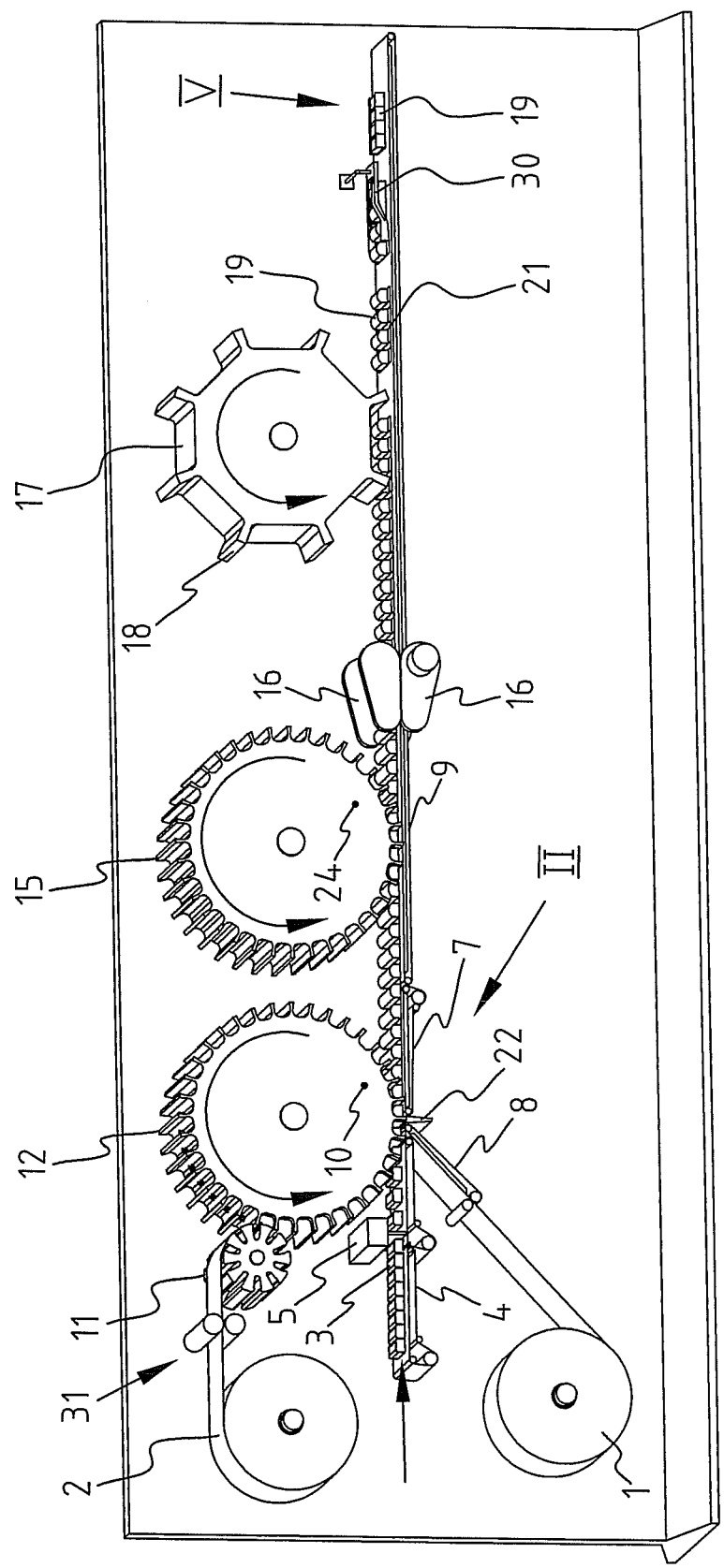
FIG. 1 shows a schematic perspective view of a packaging device.
Figure 2:
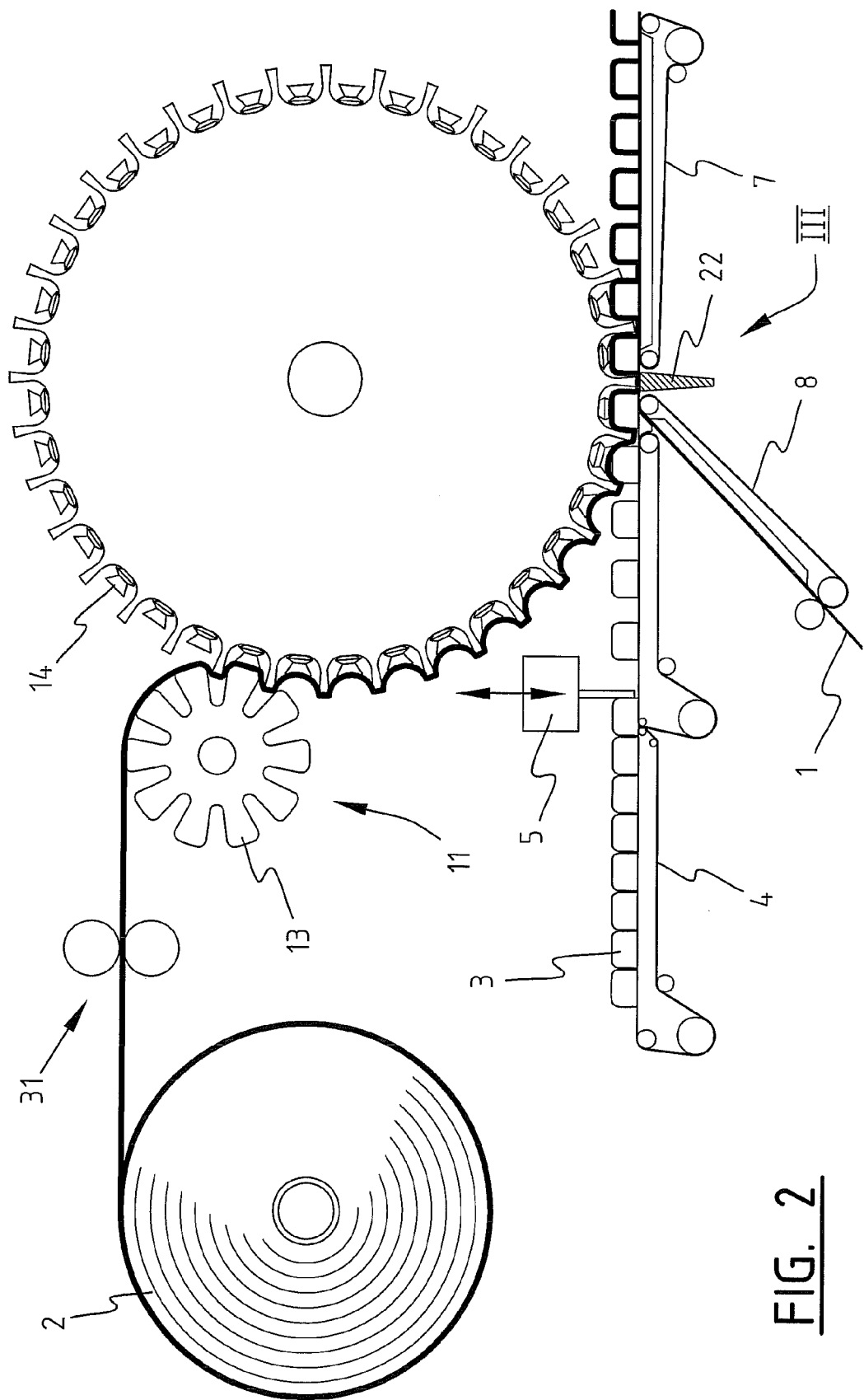
FIG. 2 shows a schematic side view of a detail of the packaging device of FIG. 1.
Figure 3:
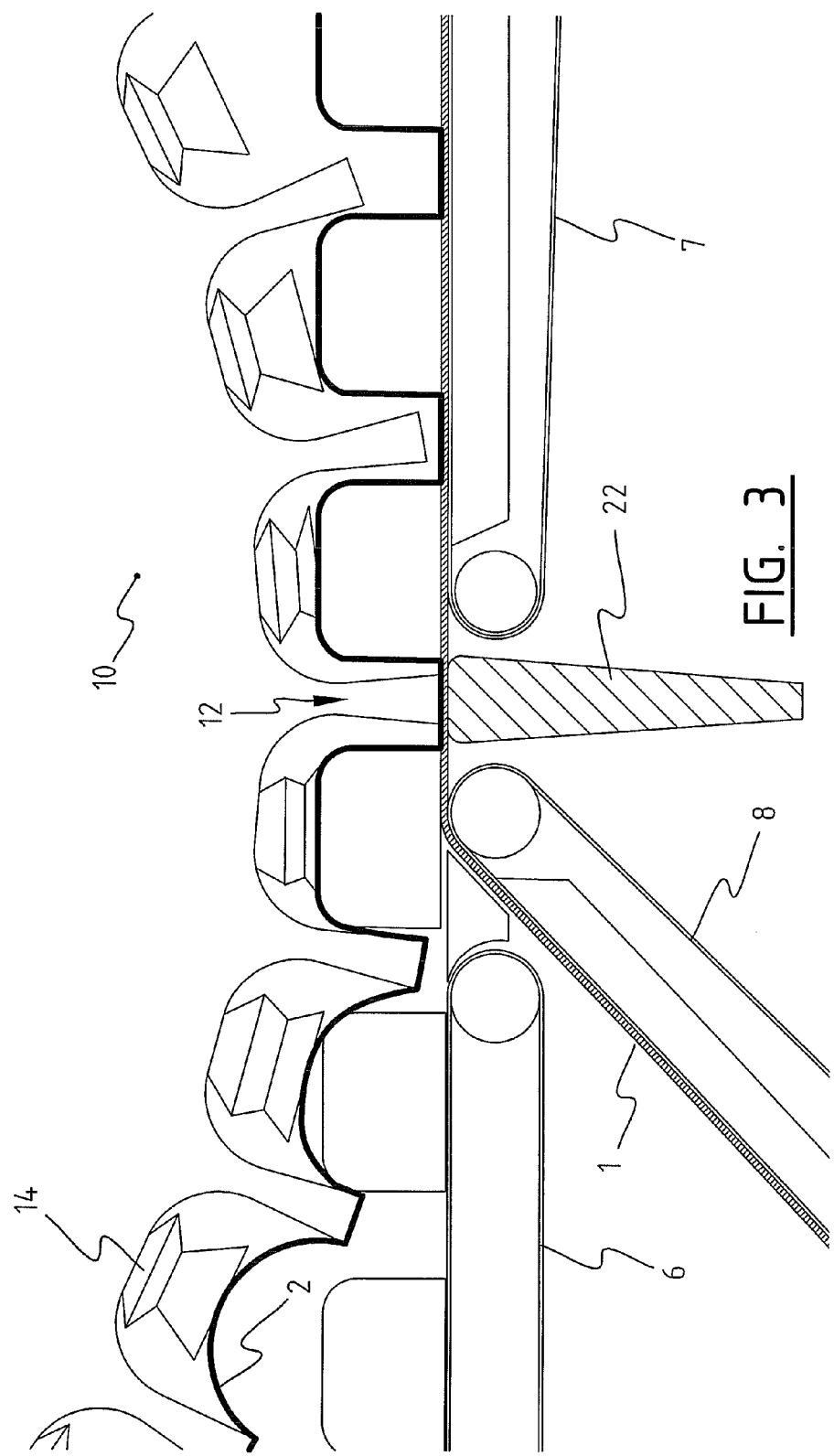
FIG. 3 shows a further schematic side view of a detail of the packaging device of FIG. 1.

With reference to FIGS. 1, 2 and 3 the packaging device has a first roll of flexible plastic film 1 (or more rigid plastic coated cardboard in an alternative embodiment) on one side and a second roll of flexible plastic film 2. Instead of plastic film also plastic coated film (for instance plastic coated metallic foil) may be used. The elongated candy bars 3 are placed transversely on a first endless conveyor 4. A separation device 5 has a barrier which moves up and down at regular intervals for spacing the candy bars 3 a pre-defined distance apart.

The second conveyor 6, the third conveyor 7, the fourth conveyor 8, the fifth conveyor 9, as well as film 1 all move at the same speed, which is larger than the speed of conveyor 4 in order to accommodate the larger mutual distance of the candy bars.

Figure 8:
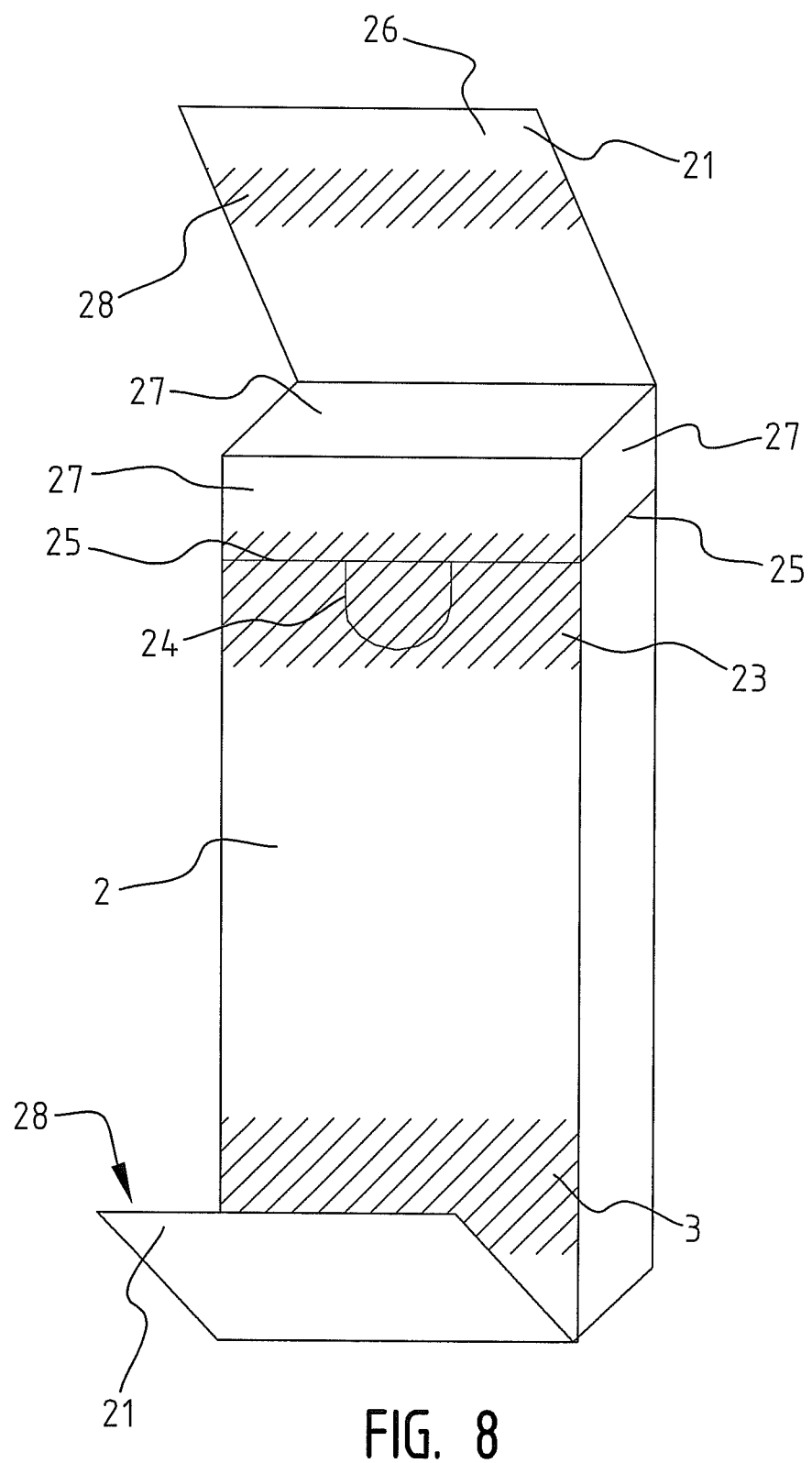
FIG. 8 shows a schematic view of the location of cuts, weakened lines and seal areas on the package in the embodiment of FIGS. 5 and 6.

The flexible plastic film 2 is first led between two rollers 31, which are provided with cutting knives to provide U-shaped cuts 24 in the film as shown in FIG. 8, and is subsequently led between co-operating rotating shaping drums 10, 11. Both drums 10, 11 have protruding shaping ribs 12, 13 which during rotation are moved between each other like a gear unit, thereby corrugating the plastic film 2 into the desired shape. The drum 10 has flexible suction cups 14 between its ribs 12 which hold the pre-shaped film by a vacuum action force.

The pre-shaped film 2 is placed on top of the moving candy bars 3 by the drum 10 while they are at the same time being transferred by the conveyor 6 onto the moving film 1. In this manner the candy bars 3 are enclosed in the flat film 1 and the pre-shaped plastic film 2. When the ribs 12 are at their lowest point 2 they push the plastic film 2 onto the plastic film 1, where the plastic film 2 is welded to plastic film 1 by a first ultrasonic welding device 22, which co-operate with ultrasonic welding means present in the sealing ribs 12. In this manner a series of interconnected tubes is formed, each tube comprising a candy bar. By changing the opening time of the separation device 5 also two or more candy bars 3 can be grouped together and enclosed in a single tube thereby.

Figure 6:
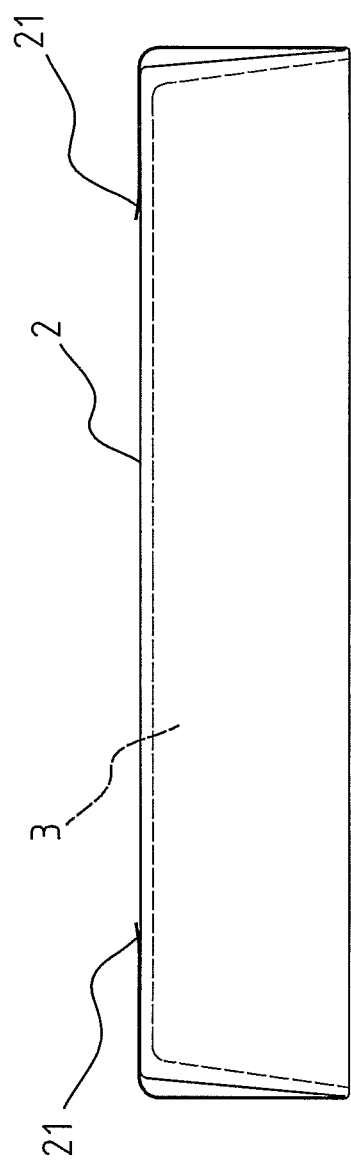
FIGS. 6 and 7 show side views of two embodiments of packaged products.
Figure 7:
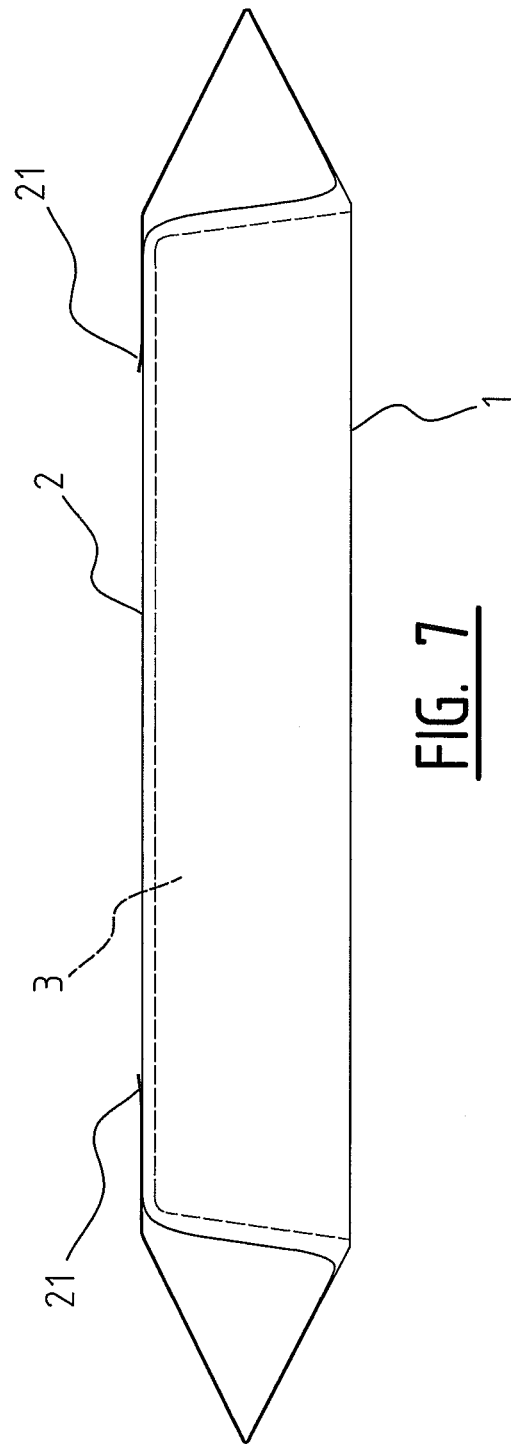

Subsequently the transverse seals between the candy bars 3 are perforated or scored by a rotating drum 24 having scoring or perforating ribs 15. Then the ends of the film 2 which extend from the sides of the candy bars 3 are pushed down by two further ultrasonic sealing devices 16 and sealed to the film 1, thereby forming sealed parts 21, whereby the candy bars 3 are enclosed inside both films in an airtight manner. Preferably the outer ends of both films 1, 2 coincide, as shown in FIGS. 6 and 7. At this stage the candy bars 3 form an endless array of interconnected packaged products. The separation drum 17 separates the products into arrays 19 of for instance six candy bars each by means of cutting ribs 18.

A folding device 30 folds both longitudinal sides of the package with the sealed outer ends 21 upwards near the outer bottom edges of the packaged products 3 and may fold them again over the outer upper edges of the shaped layer 2, as shown in FIG. 6. The sealed sides that extend from the outer ends of the products 3 are thereby folded back to the part of the film 2 that surrounds the product 3 and is bonded thereto as will be explained later.

Figure 4:
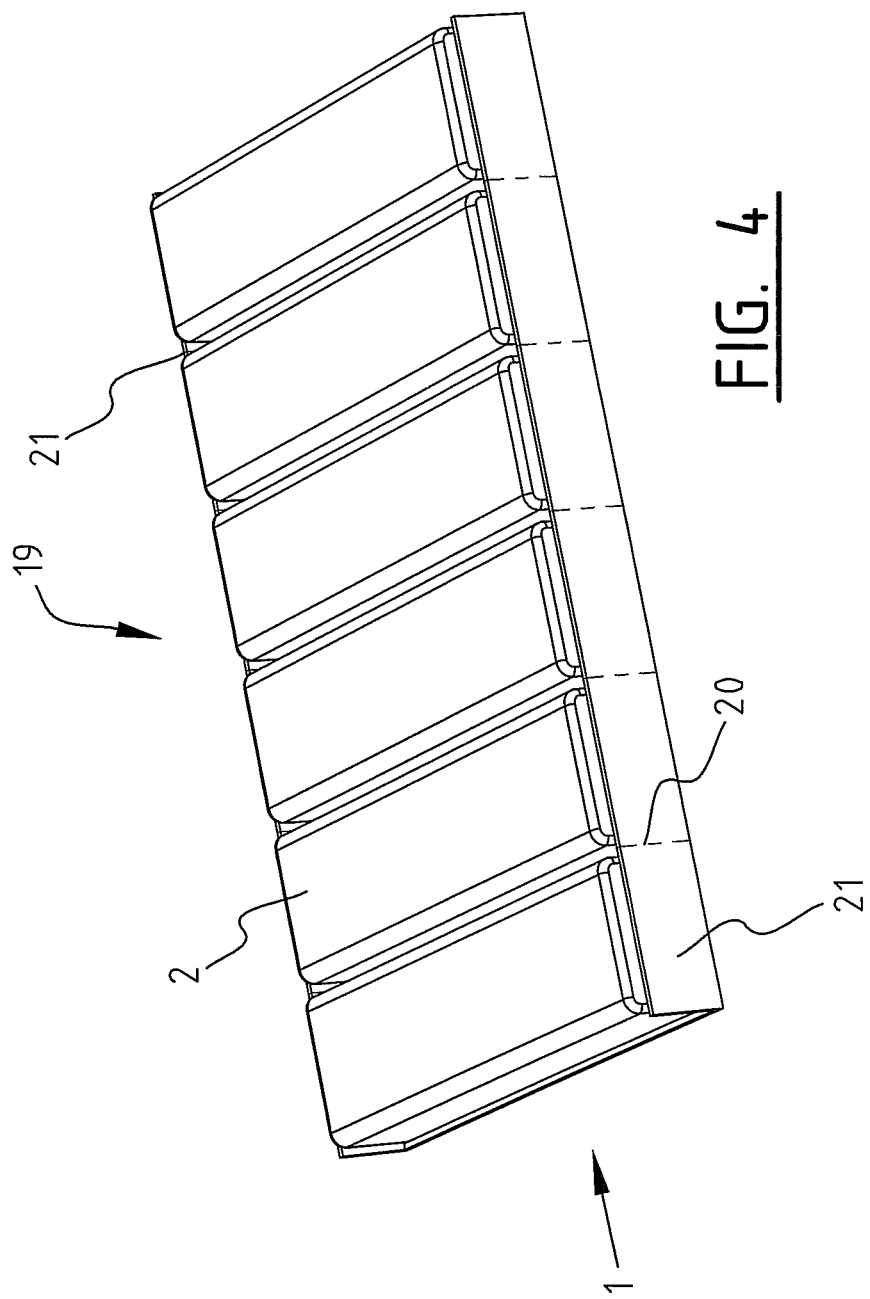
FIG. 4 shows a perspective view of an array of packaged products.

The array 19 of candy bars 3 as shown in FIG. 4 has a flat layer 1 on the bottom side and a shaped plastic film layer 2 on the top side which is sealed onto the cardboard layer 1 in between the candy bars 3. These transverse seals have scores or perforations 20 so that individual products can be easily torn off, without breaking the seal. Both sealed longitudinal sides of the package with the sealed outer ends 21 are folded upwards and may be sealed to the sides of the film 2, giving the array 19 such rigidity that it can subsequently be treated as a box. In the embodiment as shown in FIG. 4 layer 1 is a plastic coated cardboard, which adds to the rigidity of the array. The layer 1 may however also be a flexible film.

Figure 5:
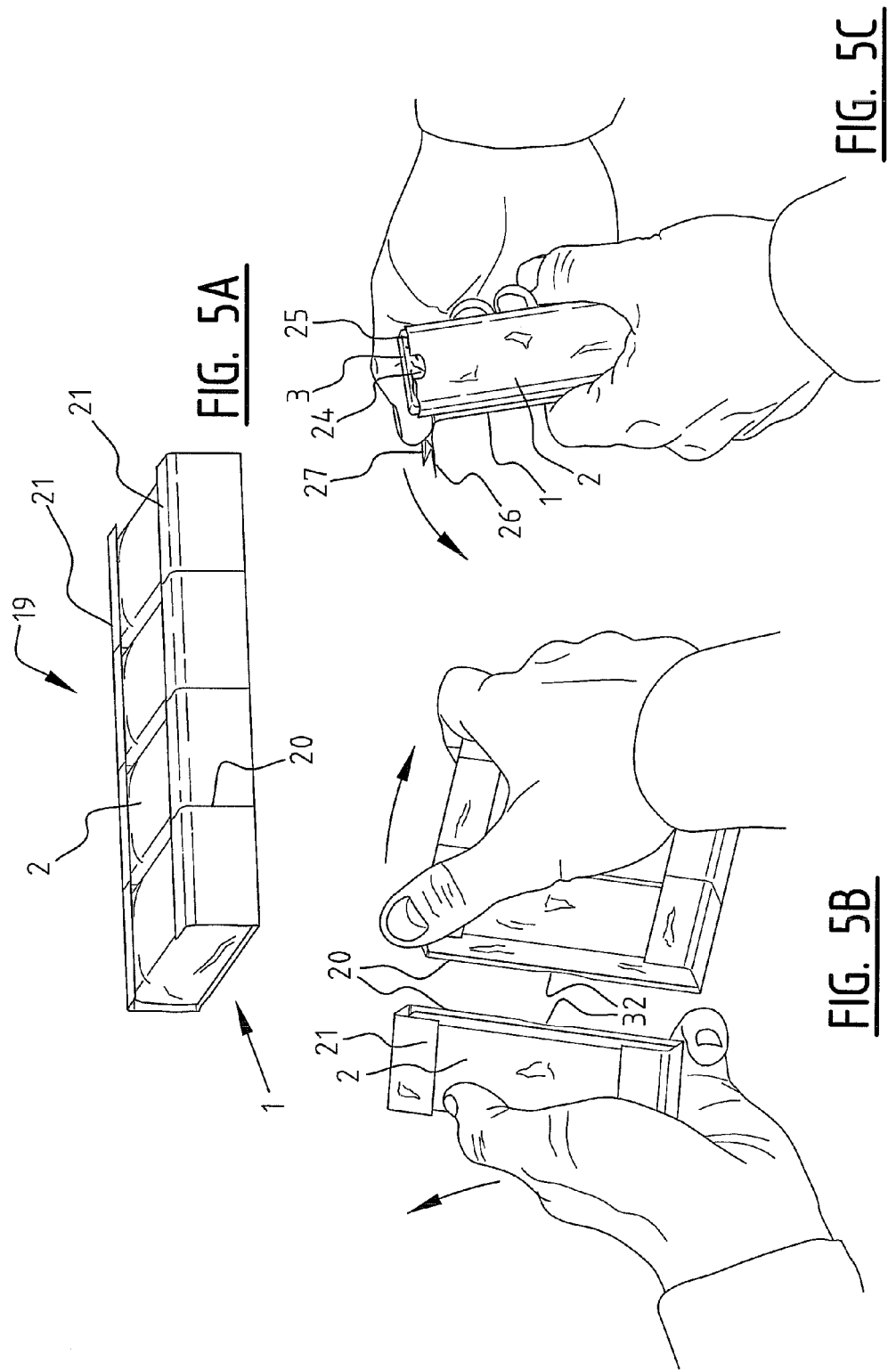
FIGS. 5A, 5B and 5C show perspective views of an array of packaged products and its use.

The array 19 of candy bars 3 as shown in FIG. 5A has a flat flexible plastic film layer 1 on the bottom side and a flexible shaped plastic film layer 2 on the top side which is sealed onto the flat layer 1 in between the candy bars 3. These transverse seals each have a score 20 and a central cut 32 along said score, so that individual products can be easily torn off, as shown in FIG. 5B, without breaking the seal. Both longitudinal sides of the package that extend away from the products 3 and which have sealed ends 21 are folded upwards near the outer bottom edges of the packaged products 3 and folded again over the outer upper edges of the shaped, corrugated layer 2, as shown in FIG. 6, and sealed to the ends of the top surface (ridges) thereof, giving the array 19 such rigidity that it can subsequently be treated as a box. In an alternative embodiment, as shown in FIG. 7, the longitudinal sides of the package are folded only once at a sharp angle at a substantial distance from the outer ends of the products 3 before being sealed to the ends of the top surface (ridges) of the shaped, corrugated layer 2, whereby a larger display area of the package is achieved. Whereas in FIG. 7 the folds at the outer ends are shown approximately halfway the bottom and the top planes of the product, in another preferred embodiment (not shown) the folds at the outer ends extend in or near the bottom plane of the product, i.e. the plane extending through the bottom film 1, whereby an extended flat display area of the film 1 is achieved.

The array 19 can be shipped to and exposed in shops, and sold to the public, without the need to enclose it in a further layer of wrapping material.

As shown in FIGS. 4 and 5A, contrary to prior art bandoleers, the distance between the products in the array is relatively small compared to the height of the products. Said distance is for instance less than 10 or 5 mm, whereas the height of the candy bars is for instance more than 15 or 25 mm.

As shown in FIG. 8 the shaped film 2 is provided with cold seal areas 28, 23. These cold seal surfaces 22, 23 are provided on the film 2 before it is fed into the packaging device. The cold seal areas 28 form two continuous bands near both outer sides of the film 2. At least on one side a band between the cold seal area 28 and the outer end of the film 2 is however not provided with cold seal material, in order to leave a grabbing portion 26. The cold seal areas 23 are rectangular areas which are provided on those locations on the film 2 that form the seal areas near the outer ends of the top surfaces of the shaped film 2 as shown. On one side of the film 2 for each packaged product a U-shaped cut 24 is provided. The cold seal area 23 surrounds said cut 24, such that when the seal area 28 of the sealed part 21 of the films 1, 2 is pressed onto the seal area 23 on the top surface of the shaped film 2, said part 21 is bonded to the film 2 and said cut 24 is sealed in an airtight manner. The U-shaped cut 24 is oriented such that the curve of the U points towards the centre of the product 3, whereas the legs of the U point towards the outer end of the product 3. The film 2 is furthermore provided with a score 25 that runs parallel to said one side of the film 2, and through the outer ends of the legs of the U-shaped cuts 24. The seal area 23 of the sealed side 21 is bonded to at least a portion 27 of the film 2 between the score 25 and the outer end of the package.

When a person takes a packaged product in one hand, and pulls the grabbing portion 26 of the sealed side 21 with the other hand, as shown in FIG. 5C, the seal area 28 on the side 21 will pull at the U-shaped seal area inside the cut 24 and the seal area above score 25, and thereby the score 25 will break and the entire peel-off section 27 forming the outer end of the package will be separated from the rest of the film 2, such that the package will be opened and the product 3 will be revealed and stick out of the package. By pulling the grabbing portion 26 or the peel-off section 27 even further, the flat film 1 will be separated from the shaped film 2 along their side edges that are sealed together, very similar to the way a banana is peeled open. Thereby the packaged product can be easily opened and consumed by a person, without touching the product.

The invention claimed is:

1. A packaged product (3) or group of products, wherein the package comprises two films (1, 2) which encloses said product (3) or group of products, and wherein part of one of said two films (1, 2) extends away from at least one outer end of the product (3) or group of products, and wherein said part of the film is bent back towards a part of the film (2) that surrounds the product and is bonded therewith, and wherein the film (2) is provided with a cut (24) and/or a weakened line in the area of the bond with the part of the one of said two films (1, 2) that is bent, such that said cut (24) and/or weakened line in said film (2) is covered and sealed in an airtight manner by said bent part of the film (1, 2) and wherein adjacent said cut (24) and/or weakened line a further weakened line (25) is provided in the film (2) extending at both sides from said cut (24) and/or weakened line, and extending around the axis of the product (3) or group of products along at least half the circumference of the product (3) or group of products.

2. A packaged product (3) or group of products in accordance with claim 1, wherein said product or group of products (3) has an elongated form and said part of the one of said two films (1, 2) is bent away from the direction of the axis of the elongated product (3) or group of products back towards said part of the film (2) that surrounds the product (3) and is bonded therewith.

3. A packaged product (3) or group of products in accordance with claim 1, wherein the area adjacent the outer end (26) of said bent part (21) of the one of said two films (1, 2) is not bonded to the other part of the film (2), such that a person can grab and pull said unbonded part (26).

4. A packaged product (3) or group of products in accordance with claim 1, wherein said bond is provided by a cold seal (23, 28).

5. A packaged product (3) or group of products in accordance with claim 1, wherein said cut (24) or weakened line is substantially U-shaped or V-shaped, wherein the curve of said U-shape or the point of said V-shape extends away from the outer end of the product (3) or group of products.

6. A packaged product (3) or group of products in accordance with claim 1, wherein the package comprises two substantially rectangular films (1, 2) which are sealed together and enclose said product (3) or group of products.

7. A packaged product (3) or group of products in accordance with claim 6, wherein said further weakened line (25) is provided in one of said two films (2) between two opposite sealed sides of the film (2).

8. A packaged product (3) or group of products in accordance with claim 6, wherein one of said films (1) is substantially flat and the other film (2) is shaped to fit at least partially around the product (3) or group of products.

9. A packaged product (3) or group of products in accordance with claim 8, wherein the shaped film (2) has a substantially U-shaped cross section in the direction transverse to the product or group of products, wherein the flat film (1) is sealed to the edges of the U-shaped film (2), such that the sealed parts of the films (1, 2) both extend outwardly, away from the product (3).

10. A packaged product (3) or group of products in accordance with claim 1, wherein said cut, said weakened line and/or said further weakened line is provided in said shaped film (2) between two opposite sealed sides of the film (2).

11. A packaged product (3) or group of products in accordance with claim 8, wherein the bent part (21) or parts of the sealed films (1, 2) are bonded to the ridge of the U-shaped film (2) that extends away from the flat film (1).

12. A packaged product (3) or group of products in accordance with claim 8, wherein the bent part or parts of the sealed films (1, 2) are folded twice to form sharp perpendicular angles, once near the plane of the flat film (1), and once near the plane through the ridge of the U-shaped film (2) to which the sealed films (1, 2) are bonded.

13. A packaged product (3) or group of products in accordance with claim 8, wherein the bent part or parts of the sealed films (1, 2) are folded close to the outer ends of the product (3) or group of products.

14. A packaged product (3) or group of products in accordance with claim 8, wherein the bent part or parts of the sealed films (1, 2) are folded back once to form a sharp small angle at a distance from the outer ends of the product (3) or group of products.

15. A packaged product (3) or group of products in accordance with claim 11, wherein the bent part or parts of the sealed films (1, 2) are bonded to said ridge near the outer ends of the product (3) or group of products.

* * * * *